G. LEPAGE.
LOOM TEMPLE.
APPLICATION FILED JUNE 28, 1917.
1,263,686.
Patented Apr. 23, 1918.
2 SHEETS—SHEET 1.
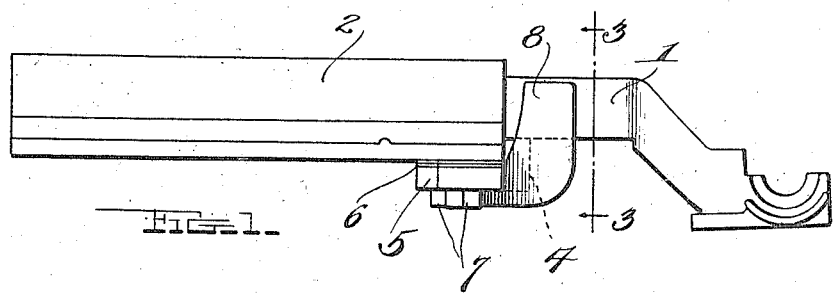
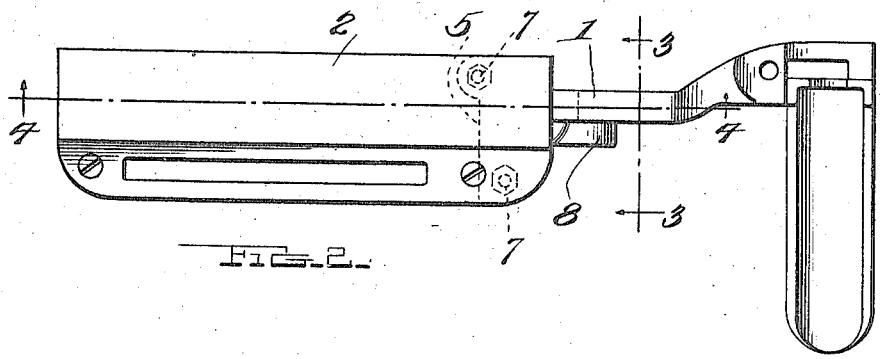
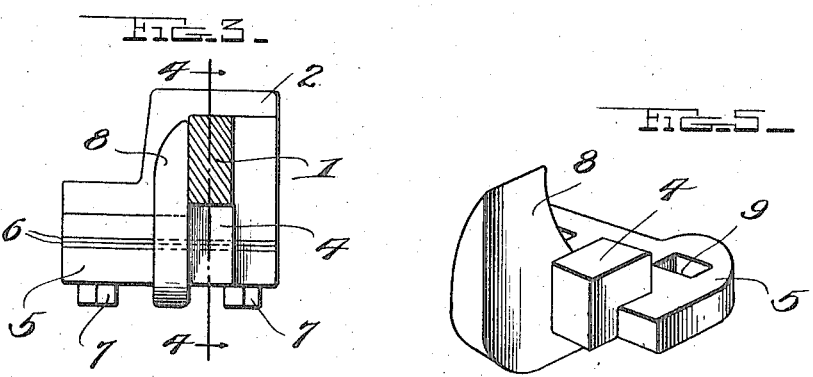
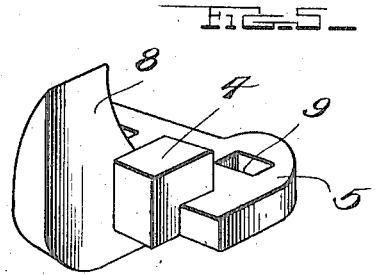
Witness
J. R. Pierce
Inventor
G. Lepage
By H. B. Willson & Co. Attorneys G. LEPAGE.
LOOM TEMPLE.
APPLICATION FILED JUNE 28, 1917.
1,263,686.
Patented Apr. 23, 1918.
2 SHEETS—SHEET 2.
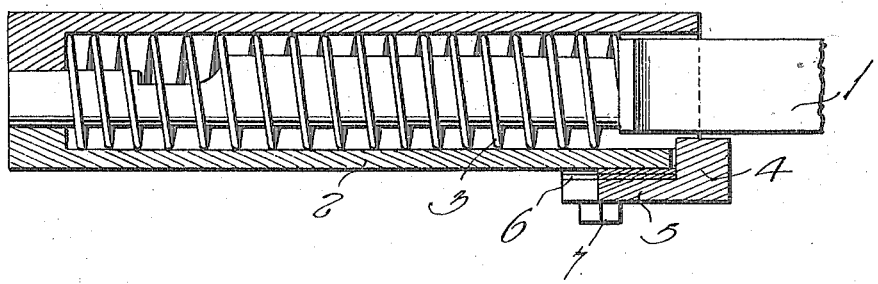
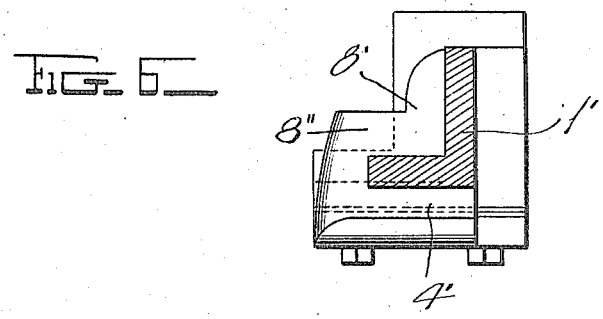
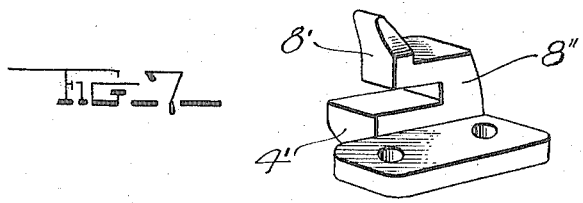
Witness
H. Woodard
Inventor
G. Lepage
By H. B. Wilson & Co.
Attorney

UNITED STATES PATENT OFFICE.

GERMAIN LEPAGE, OF TIVERTON, RHODE ISLAND.

LOOM-TEMPLE.

1,263,686.

Specification of Letters Patent.

Patented Apr. 23, 1918.

Application filed June 28, 1917. Serial No. 177,544.

*To all whom it may concern:*

Be it known that I, GERMAIN LEPAGE, a citizen of the United States, residing at Tiverton, in the county of Newport and State of Rhode Island, have invented certain new and useful Improvements in Loom-Temples; and I do declare the following to be a full, clear, and exact description of the invention, such as will enable others skilled in the art to which it appertains to make and use the same.

My invention relates to improvements in loom temples and has for its object to take up wear in old temples and to prevent such wear in temples which have not long been in use, and with this general object in view, the invention resides in the novel features of construction and unique combination of parts to be hereinafter fully described and claimed, the descriptive matter being supplemented by the accompanying drawing which forms a part of this specification and in which:

Figure 1 is a side elevation of a loom temple showing the application of my invention;

Fig. 2 is a top plan view of Fig. 1;

Fig. 3 is a vertical transverse section on the plane indicated by the lines 3—3 of Figs. 1 and 2;

Fig. 4 is a longitudinal section on the plane designated by the line 4—4 of Figs. 2 and 3;

Fig. 5 is a perspective view of the form of the invention shown in the preceding figures;

Fig. 6 is a transverse section similar to Fig. 3, showing a slightly different form of construction; and Fig. 7 is a perspective view of the type of the invention shown in Fig. 6.

In the drawings above briefly described, the numeral 1 designates the sliding shank of a common type of loom temple, whereas 2 has reference to the case in which said shank is slidably mounted, the usual coiled spring 3 being provided for protecting the shank after it is retracted. The outer end of the shank 1 carries the usual or any preferred type of guide which forms no part of the present invention, and need not therefore be described or illustrated in detail.

Temples constructed as above described, have been in use in practically every textile and woolen factory throughout the several continents for a great number of years and experience has taught that the lower edges of the shanks 1 as well as the bottom of the cases 2 and the sides of these parts, become so worn by continual use, that the temple is not at all effective. The present invention aims to overcome this difficulty by providing a shoe upon which the shank is slidably supported, said shoe having an upstanding wall for contact with one side of the shank. By this construction, all wear is taken up by the shoe and said wall, which parts may be readily adjusted whenever occasion may demand or may be renewed at small expense. The device may be incorporated in a multiplicity of forms for adaptation to the many types of loom temples, but for illustrative purposes I have shown only two types of the invention, which types are described below.

In Figs. 1 to 5, the numeral 4 has reference to a rectangular wear shoe of hardened metal, said shoe supporting thereon the shank 1, which latter is held from contact with the bottom of the case 2 by said shoe as will be clear from Fig. 4. An attaching plate 5 is formed integrally with the inner end of the shoe 4, said plate underlying the bottom of the case and being preferably spaced therefrom by a plurality of shims or washers 6, one or more of which may be removed as required, so that the entire shoe may be moved upwardly as the upper surface thereof and the lower edge of the shank 1, become worn. Attaching screws 7 are preferably provided for securing the plate 5 in place, but it is to be understood that any suitable means could be employed for this purpose.

Rising from one edge of the shoe 4 and formed integrally with said shoe, to form therewith an angular seat, is a vertical wall 8 which is adapted to contact with the inner side of the shank 1 to prevent lateral shifting of said shank, said wall therefore serving to prevent excessive wear of the inner side of the shank and the adjacent portion of the case 2. The wall 8 may be of the design shown in the drawings or of any other appropriate contour, as long as it is suitably designed for carrying out the required ends.

In the form of the invention illustrated in Figs. 6 and 7, the shank 1' is shown constructed of angle metal, and when this construction is followed it is necessary that the device be varied somewhat in shape. As shown in these figures, the shoe 4' will underlie the horizontal portion of the shank, whereas the wall 8' must be of the construction shown so that it will properly engage the shank as clearly shown in the figures above referred to. The lower end 8'' of the wall 8' is joined integrally to the shoe 4', and said shoe and wall co-act in forming a seat for the shank 1'. The form of the invention last described, as well as the other, will be an effective means for preventing wear of the case 2, and for preventing lateral and vertical shifting of the shank. As the shoe becomes worn, one or more of the washers 6 may be removed so that said shoe may be shifted upwardly to the required extent, whereas wear of the wall 8—8', may be compensated for by shifting the entire device laterally to a slight extent, the attaching plate 5 being preferably formed with slots 9 through which the screws 7 pass, in order that this adjustment may be made. It is to be understood, however, that if desired, the worn devices may be totally discarded when they no longer perform their functions effectively.

From the foregoing, taken in connection with the accompanying drawings, it will be obvious that although my invention is of extremely simple and inexpensive construction, it will be highly efficient and advantageous for the purposes intended. Since probably the best results are obtained from the specific construction shown and described, such construction constitutes the preferred form of my invention. I wish it understood, however, that within the scope of the appended claims numerous minor changes may be made without sacrificing the principal advantages.

I claim:

1. The combination with the sliding shank of a loom temple and the case in which it slides, of a wear shoe secured to said case, said shoe extending beneath and supporting said shank.

2. The combination with the sliding shank of a loom temple and the case in which it slides, of a wear shoe secured to said case and supporting said shank, and a wall rising from one side of said shoe and contacting with said shank to prevent lateral movement thereof.

3. A support for the sliding shanks of loom temples comprising an angular seat member adapted to receive the shank thereagainst and having both horizontal and vertical portions for contact with said shank, and means for securing said seat member to the case of the temple.

4. A support for the sliding shanks of loom temples comprising an attaching plate to be secured to the case in which the shank slides, a wear shoe formed on said plate to receive said shank thereon, and a wall rising from one edge of said shoe for contact with said shank to prevent lateral movement thereof.

In testimony whereof I have hereunto set my hand in the presence of two subscribing witnesses.

GERMAIN LEPAGE.

Witnesses:
ALVIN G. WEEKS,
JOSEPH P. LE PAGE.